April 9, 1968

J. R. BENDER 3,376,960

DISC ELEMENT CONSTRUCTION FOR DISC BRAKE

Filed Aug. 1, 1966

INVENTOR.
JOHN R. BENDER.
BY
*William N. Antonis*
ATTORNEY.

April 9, 1968   J. R. BENDER   3,376,960
DISC ELEMENT CONSTRUCTION FOR DISC BRAKE
Filed Aug. 1, 1966   3 Sheets-Sheet 2

INVENTOR.
JOHN R. BENDER.
BY
*William N. Antonis*
ATTORNEY.

April 9, 1968  J. R. BENDER  3,376,960
DISC ELEMENT CONSTRUCTION FOR DISC BRAKE
Filed Aug. 1, 1966  3 Sheets-Sheet 3
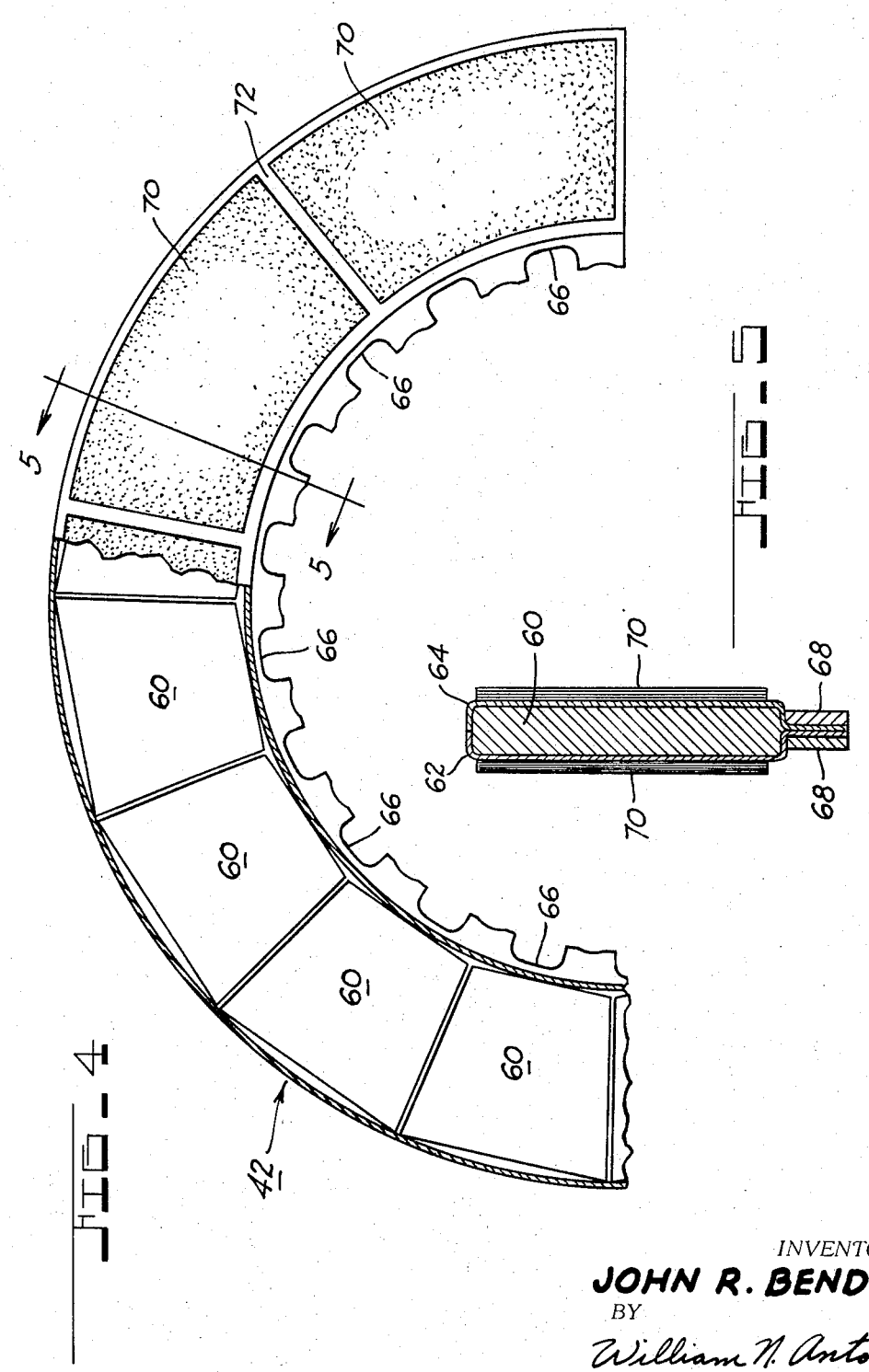
INVENTOR.
JOHN R. BENDER.
BY
William N. Antonis
ATTORNEY.

United States Patent Office 3,376,960
Patented Apr. 9, 1968

3,376,960
DISC ELEMENT CONSTRUCTION
FOR DISC BRAKE
John R. Bender, South Bend, Ind., assignor to The
Bendix Corporation, a corporation of Delaware
Filed Aug. 1, 1966, Ser. No. 569,302
3 Claims. (Cl. 188—218)

ABSTRACT OF THE DISCLOSURE

The following relates to disc brakes, particularly for aircraft, having a unique friction disc element construction which incorporates beryllium as a heat sink core. The heat sink core is formed of a plurality of separate beryllium segments which are structurally supported and encapsulated by a hollow two-piece steel retainer to form an annular composite sandwich-type disc element.

---

Since beryllium is characterized by its high specific heat, low density, and high thermal conductivity, the advantages which would flow from utilizing beryllium as a heat sink material in an aircraft disc brake will be obvious to those skilled in the art. However, despite such advantages, beryllium has had limited use in brakes because of certain inherent mechanical and physical characteristics of the material. Firstly, it cannot be used as a wear surface because the resultant wear debris is in the form of very fine particles of beryllium oxide. This oxide is toxic and creates a health hazard to human beings. Secondly, in order to improve current aircraft brakes on an energy per unit of volume basis, it is necessary to attain working temperatures of 1700° F. or greater. Since the structural capabilities of beryllium are relatively low at such elevated temperatures, some sort of structural support for the beryllium is required. Structural support is also necessary because of susceptibility of cracking due to thermal stresses. Thirdly, beryllium is susceptible to oxidation at increasing rates, if unprotected, at temperatures above 1400° F.

Accordingly, in view of the foregoing, it is an object of this invention to provide a unique friction disc element construction utilizing beryllium therein which provides an adequate wear surface for the beryllium, the necessary structural support for the beryllium, and the required protection against oxidation of the beryllium.

Another object of this invention is to provide a friction disc element construction utilizing beryllium wherein the beryllium is subjected only to compression stresses.

A further object of this invention is to provide a friction disc element construction wherein the beryllium utilized therein is in the form of segments, said segments being maintained in an annular configuration by encapsulation.

A still further object of this invention is to provide a disc element construction of the foregoing type wherein the same general construction can be utilized to form a rotor or a stator for an aircraft brake.

The above and other objects and features of the invention will become apparent from the following description taken in connection with the accompanying drawings which form a part of this disclosure and in which:

FIGURE 4 is a side elevation of one-half of a symmetrical stator removed from the brake assembly of FIGURE 1 with portions of the stator broken away for clarity; and FIGURE 5 is a sectional view taken along line 5—5 of FIGURE 4.

Figure 1:
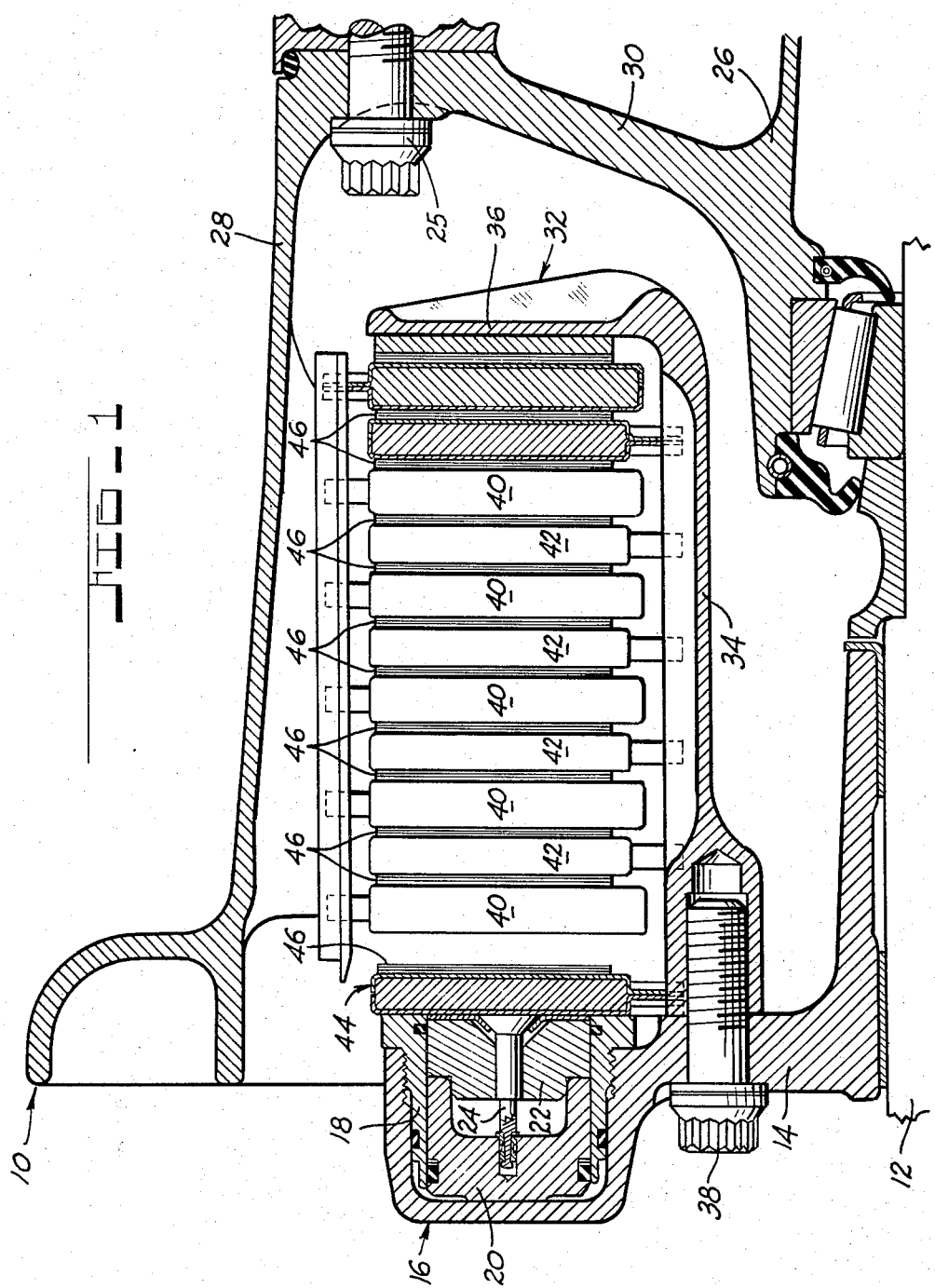
FIGURE 1 is a sectional view of a portion of a symmetrical wheel and brake assembly which incorporates the invention.

Referring to FIGURE 1, it will be seen that the wheel and brake assembly which is illustrated includes a wheel 10 rotatably mounted on a stationary axle 12 and a stationary carrier member 14 which is connected to the axle through any suitable means, such as by a direct bolt connection (not shown). The construction for rotatably mounting the wheel 10 to axle 12 and fixing the stationary carrier 14 to the axle 12 is well known, and a detailed description thereof is not deemed to be necessary. The carrier contains a plurality of fluid motors 16, each of which includes a protective sleeve 18 threadedly secured to said carrier and a piston 20 located and slidable in said sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 25, includes a hub portion 26 and a rim portion 28 interconnected by a plurality of spokes 30. A torque tube 32, which includes a sleeve 34 and an annular backing plate flange 36, is fixedly secured to the carrier member 14 by a plurality of circumferentially spaced bolts 38.

The brake which is illustrated is of the disc type and includes a plurality of interleaved rotors 40 which are splined to and are rotated by the aircraft wheel 10, and stators 42 which are splined to sleeve 34 of the torque tube 32. The specific novel construction of the rotors and stators will be described hereafter. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motors 16, forces the rotors 40 and stators 42 against each other upon actuation of the motors by thrusting at one side of the stack and biasing the entire stack against the backing plate 36. Pressure plate 44, each of the stators 42, and the backing plate have friction material lining 46 provided thereon.

Figures 2, 3:
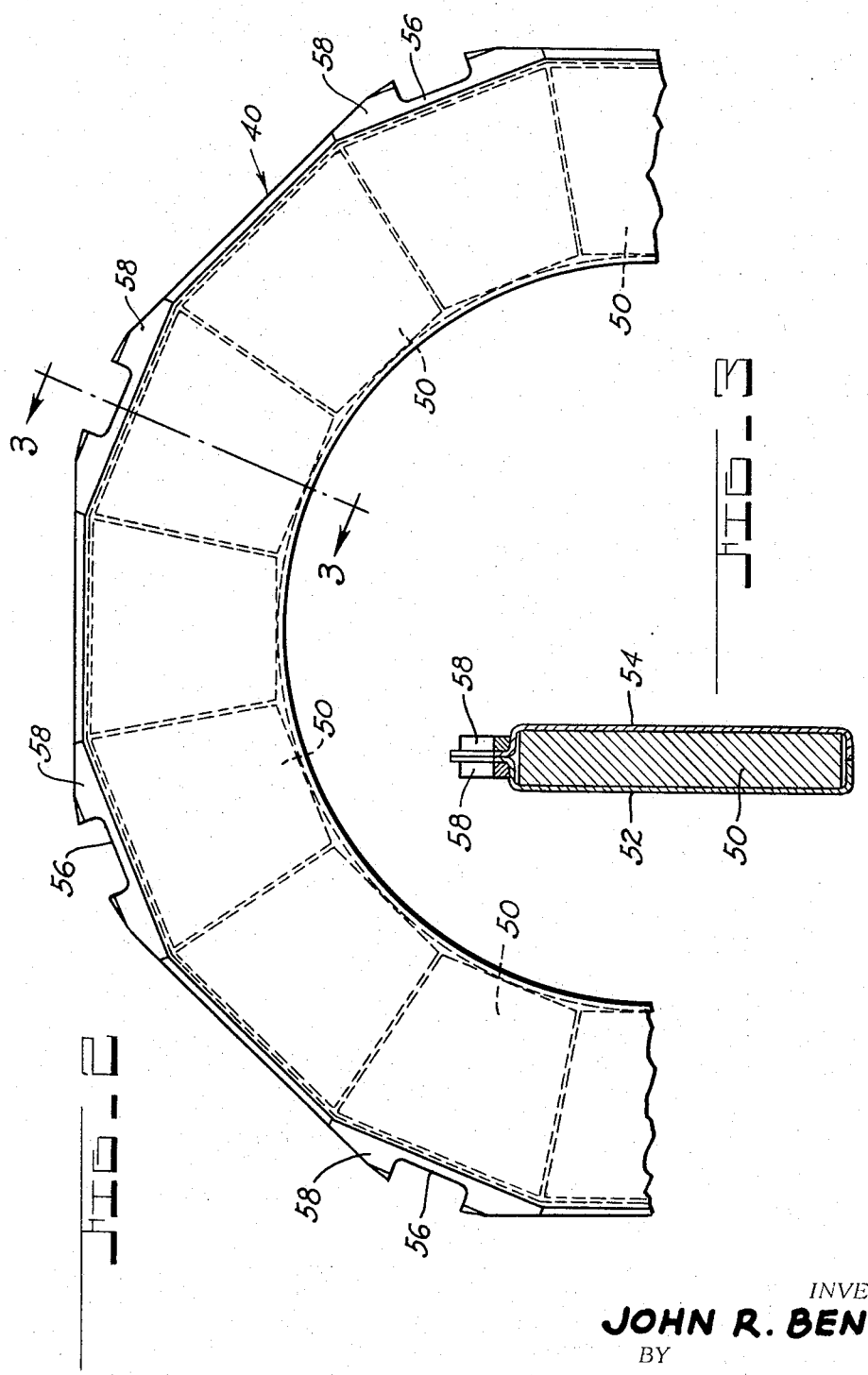
FIGURE 2 is a side elevation of one-half of a symmetrical rotor removed from the brake assembly of FIGURE 1.
FIGURE 3 is a sectional view taken along line 3—3 of FIGURE 2.

Referring to FIGURES 2 and 3, which show the novel detailed construction of each of the rotors 40, it will be seen that each rotor is comprised of a heat sink core formed of a plurality of separate beryllium segments 50 having a substantially trapezoidal shape which are in effect encapsulated by two annular retainers 52 and 54 to form an annular composite sandwich type rotor disc. Other material having the characteristics of beryllium, particularly a high enthalpy, that is a high heat content per unit mass, would also be suitable as a heat sink core. The retainers 52 and 54, which are suitably connected to each other, such as by welding, include a plurality of key slots or notches 56 formed in the outer periphery thereof for slidably engaging axially extending driving keys carried by the wheel 10. A pair of identical oppositely disposed reinforcing straps 58 are welded or otherwise suitably connected to the retainers 52 and 54 at each key slot to transmit torque. The retainers are formed of a material having a good wear surface, such as for example Timken 1722A–S steel, and have a relatively small thickness, said thickness being determined by the structural requirements of the rotor and the amount of surface wear which will occur. The beryllium is segmented within the steel retainers in order to allow for the difference in coefficient of expansion between beryllium and steel at elevated temperatures. Although the beryllium segments are shown in the drawings as being trapezoidal segments annularly arranged, it will be understood that these segments could be arcuate segments annularly arranged, or even concentrically arranged segments located within the steel retainers. The beryllium segments 50, which may be cut from extruded bar or segmented from a formed ring, are sized so as to allow for difference in thermal expansion in the assembled state. The retainers 52 and 54 can be most expediently formed by stamping with extended lips at their interface for welding. The retainers may also be joined at their inside diameter dependent upon the desired thermal conductivity between the steel and beryllium.

In order to improve the thermal conductivity between the steel retainer friction interface and the beryllium segments, which segments have four to five times the thermal conductivity of steel, it has been found that metallurgically or mechanically joining the adjacent plan areas of the retainers and segments is desirable. For optimum thermal conductivity a metallurgical bond is preferred, such as that which can be attained by silver brazing the steel retainers to the beryllium segments. Silver appears to be the most suitable presently known metal because of its extremely high thermal conductivity and because it is the highest melting point metal or alloy which will provide a metallurgical joint between steel and beryllium.

If optimum thermal conductivity is not needed, thermal conductivity can still be enhanced via mechanical approaches. One approach would be to place a low melting alloy between the steel and beryllium. The requisites of such an alloy in the liquid state would be: (a) high thermal conductivity; (b) wetting ability for the steel and beryllium; and (c) compatibility with steel and beryllium at brake operating temperatures, i.e., absence of integranular diffusion for the steel and beryllium. It would also be desirable that the melting point be as low as possible. By way of example, the eutectic of lead-bismuth (Pb, 44.5 weight percent; Bi, 55.5 weight percent) would be suitable. However, others could be equally or even more suitable.

Another mechanical approach is to sandwich a comparatively soft material, such as sliver foil, between the steel and beryllium whose surfaces possess a high r.m.s. for increasing the contact area when pressure contact is made. A further mechanical approach is simply to provide direct mechanical contact between the steel and beryllium.

The foregoing described constructions can also be utilized in connection with the stationary disc elements of an aircraft brake simply by inverting the drive lug provisions from the outside diameter of the disc element to the inside diameter thereof. More specifically, referring to FIGURES 4 and 5, it will be seen that the construction of each of the novel stators 42 is similar to that of the rotors 40. Thus, each stator is comprised of a heat sink core formed of a plurality of beryllium segments 60 having a substantially trapezoidal shape which are encapsulated by two identical annular retainers 62 and 64 to form an annular composite sandwich type stator disc. The retainers, which are suitably connected to each other, such as by welding, include a plurality of key slots or notches 66 on the inner periphery thereof which slidably engage axially extending keys preferably formed as integral parts of torque-absorbing member 34. A pair of identical oppositely disposed reinforcing torque rings 68 are welded or otherwise suitably connected to the inner periphery of the retainers 62 and 64. Suitable friction lining 70 which is flame sprayed, pressure sintered, or otherwise suitably connected to the surface of each of the retainers, is disposed so as to include a plurality of equally spaced scavenging slots 72 therebetween. It will be understood that, if desired, friction lining can also be suitably connected to the retainer wall surfaces of the rotors 40 in order to provide the thinnest possible rotor retainer walls and minimize the amount of wear with respect thereto.

Some of the many advantages of a rotor or stator disc element constructed in the foregoing novel manner are as follows:

(a) The beryllium is subjected only to compression stresses. Should the beryllium crack, for any reason, it will be retained in position. Furthermore, greater structural support is provided by the higher strength of steel components at higher temperatures.

(b) Because the beryllium segments are encapsulated by the retainers, the beryllium is protected from oxidation.

(c) Because of the beryllium, rotor and stator disc elements of the foregoing described construction can be utilized at operating temperatures approaching 2000° F., said operating temperature being restricted only by the strength capabilities of steel at the operating temperature. Even if compression loads exceed the allowable mechanical compression loads of the beryllium at elevated temperatures, the steel retainers will prohibit mushrooming of the beryllium and will maintain the proper axial thickness of the brake discs.

(d) The segmentation of the beryllium will permit thermal relief and will provide for differential expansion between the steel and beryllium components of the brake discs.

(e) The unique beryllium brake disc construction described herein permits an increased heat capacity per unit volume as well as lesser weight over conventional state of the art steel heat sinks.

(f) The composite sandwich structure enhances heat transfer from the friction interface to the core when compared with conventional steel heat sink components. This increases the potential rate of energy conversion per unit area of the friction area.

In addition to the above advantages, other advantages may suggest themselves to those who are familiar with the art to which this invention relates.

Furthermore, although this invention has been described in connection with certain specific embodiments, it will be obvious to those skilled in the art that various changes may be made in the form, structure and arrangement of components without departing from the spirit of the invention. For example, certain reversals in the relationship of the parts may be readily made. While the rotor drive connection and the torque-absorbing connection have been illustrated as male drive keys and torque-absorbing keys secured to the wheel and torque-absorbing member, respectively, which engage female slots on the rotor disc elements and stator disc elements, respectively, it is also common practice to form male projections on the rotor and stator disc elements for engagement with female slots in the wheel and torque-absorbing member.

Accordingly, I do not desire to be limited to the specific embodiments disclosed herein primarily for purposes of illustration, but instead desire protection falling within the scope of the appended claims.

Having thus described the various features of the invention what I claim as new and desire to secure by Letters Patent is:

1. In a wheel and brake assembly having axially extending key- and slot-type connecting means, a friction disc element comprising a hollow annular steel retainer having spaced-apart parallel flat walls and radially inner and outer edges, a segmented beryllium heat sink core located within and in contact with said walls, said core being formed of a plurality of annularly arranged segments and being structurally supported by said annular retainer, a low-melting alloy having a high thermal conductivity located between and in contact with said beryllium segments and the walls of said steel retainer, and means formed on one of said edges of said retainer for slidable engagement with said key- and slot-type connecting means.

2. A friction disc element, as defined in claim 1, wherein said alloy is a eutectic of lead-bismuth which is 44.5% lead and 55.5% bismuth by weight.

3. In a wheel and brake assembly having axially extending key- and slot-type connecting means, a friction disc element comprising a hollow annular steel retainer having spaced-apart parallel flat walls and radially inner and outer edges, a segmented beryllium heat sink core located within and in contact with said walls, said core being formed of a plurality of annularly arranged segments and being structrally supported by said annular retainer, silver foil located between and in contact with said beryllium segments and the walls of said retainer, and means formed on one of said edges of said retainer for slidable engagement with said key- and slot-type connecting means.

References Cited

UNITED STATES PATENTS

| | | |
|---|---|---|
| 2,943,715 | 7/1960 | Aldrich et al. |
| 3,237,731 | 3/1966 | DuBois _____ 188—218 |
| 3,306,401 | 2/1967 | Dasse _____ 188—25 |

FOREIGN PATENTS

| | | |
|---|---|---|
| 1,225,964 | 2/1960 | France. |
| 638,573 | 6/1950 | Great Britain. |

MILTON BUCHLER, *Primary Examiner.*

GEORGE HALVOSA, *Examiner.*